Aug. 14, 1962 C. D. POLOS 3,049,358
TOOLING AND METHOD OF INSTALLING EXPANSION SHELLS
Filed Jan. 18, 1960 2 Sheets-Sheet 1
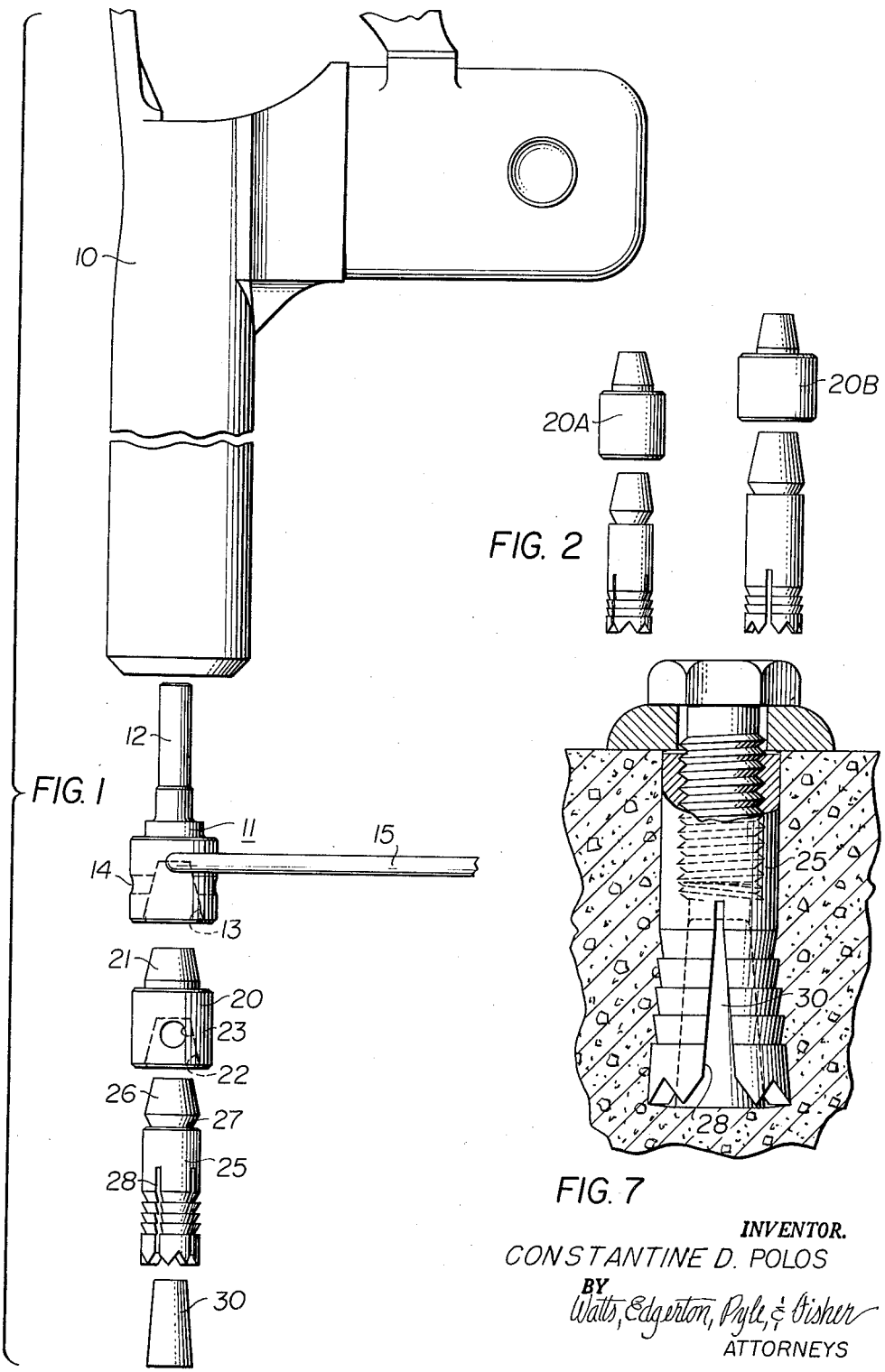
INVENTOR.
CONSTANTINE D. POLOS
BY
Watts, Edgerton, Pyle, & Fisher
ATTORNEYS Aug. 14, 1962  C. D. POLOS  3,049,358
TOOLING AND METHOD OF INSTALLING EXPANSION SHELLS
Filed Jan. 18, 1960  2 Sheets-Sheet 2
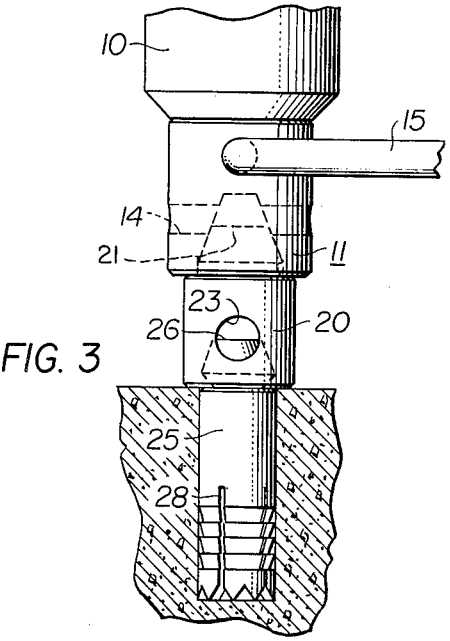
FIG. 3
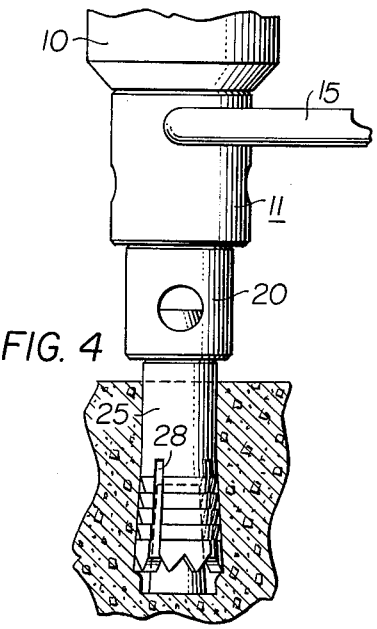
FIG. 4
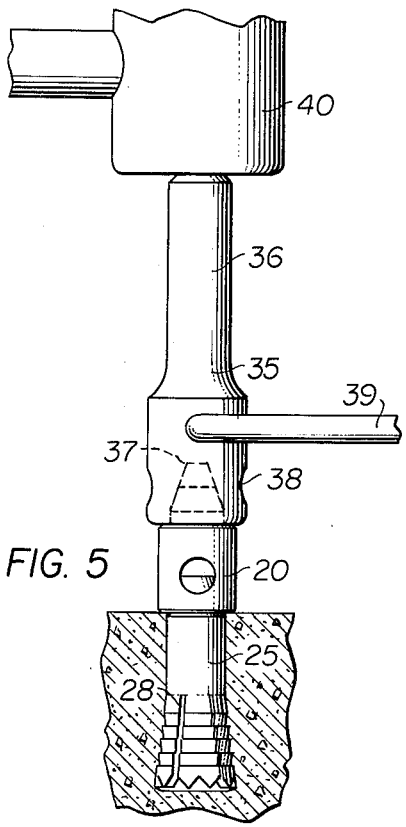
FIG. 5
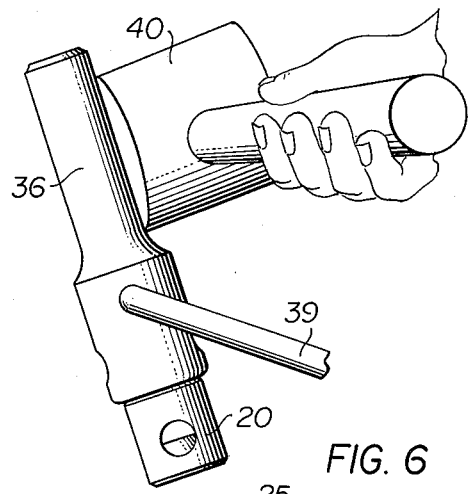
FIG. 6
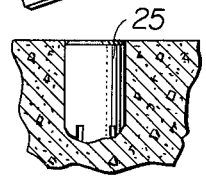
INVENTOR.
CONSTANTINE D. POLOS
BY
Watts, Edgerton, Pyle, & Fisher
ATTORNEYS various steps of fastener installation. The power hammer 10 is the usual commercial unit. It is provided with an extending socket 11 into which the usual tool fits. A driving adapter 12 is shown in exploded relationship with respect to the power hammer 10. This adapter 12 has a shank end 13 which will fit into the socket 11 and an enlarged head 14 with a driving face 15 at the outer end. The driving face 15 is provided with a socket 16 which is of conical configuration to conform to the conical head of the fastener 17.

3,049,358
TOOLING AND METHOD OF INSTALLING EXPANSION SHELLS
Constantine Daniel Polos, Amherst, Ohio, assignor to Gregory Industries, Inc.
Filed Jan. 18, 1960, Ser. No. 3,159
1 Claim. (Cl. 279—102)

This invention relates to a novel and improved tool system for use in application of a type of fastener known as an expansion shell and drill.

The anchor fastening device to which this invention most closely pertains is a type which embodies a shell having one end formed with teeth suitable for drilling into cured masonry bodies and having longitudinal slots partially along the wall of the shell from the drill end. The interior of the opposite end of the shell is usually threaded to accept a fastening bolt although some of the shells are formed with special head ends for securing tie rods and other such members.

There are generally two types of shell forms with respect to the means to hold and vibrate the shell. The most common form for rapid production embodies a top end which is provided with a conically formed head secured to the body of the shell at a necked area. This area is frangible by a lateral blow. These shells are case hardened in order that the longitudinally grooved area along the drill end will be brittle and in order that the teeth of the drill end will be hard to resist the concrete into which the fastener is being set. Further, such hardening aids materially in the frangibility of the necked area to which the head is secured. This general shell construction is now old and well known. Further, these shells are also made without a conically formed head for special-purpose manual installation. A threaded hand tool is employed in place of the head and an ordinary hammer is employed to tap the hand tool. Thus, the shell is employed in quite similar fashion to a star drill. Such hand operation has no bearing with respect to the present invention.

Since the inception of this type of a drill anchor device, the type of shell with a conical head has been widely accepted as the best embodiment for large-scale production use. This conical head permits the use of a power tool to vibrate the shell. It has been the practice to employ a longitudinally vibrating air or electric hammer to cause the shell to vibrate against the concrete. A chuck is employed to hold the conical head by a wedge fit and this chuck is equipped with a laterally extending handle which will permit the chuck and shell to be rotated through a partial circle while it is being vibrated. Thus, the shell will cause a hole to be drilled into the concrete of exactly the size of the shell. No concern need be had as to whether the hole is being drilled to the correct size as would be the case if a separate independent drill device were first employed and the shell then inserted. The same shell used for drilling the hole is then reinserted into the cleaned hole over a conically shaped hardened plug and the hammer which was employed for drilling the hole is then used to drive the shell down over the plug and cause the longitudinal slot to fracture and spread the end of the shell.

Since its early inception, the promoters of such an expansion type fastener have provided users with a separate chuck for each size of conical head, which conical head increases in size through ranges as the size of the drill anchors increase. Thus, it has been necessary to provide about seven separate chucks and keys with rotating handles to handle the entire practical line of the expansion shells. Furthermore, the promotion of these shells has included instructions to use a hand hammer to break off the chucking end of longer size fasteners. It has been found to be quite dangerous to break off the extremely hard neck area by striking the chucking end with a hammer. These broken ends fly with severe force and are a danger to bystanders. Furthermore, it is a nuisance at least, and often a serious production handicap, to be required to have a series of chucks for installation whenever a variety of different size anchor shells are to be installed.

One principal object and advantage of the present invention is to provide an integrated system of adapters and setting tools which will materially reduce the number of tools necessary to handle a complete line of sizes and to make possible the complete installation of the larger size anchor members without the use of an overly large power hammer.

Further, it is an object of the present invention to prevent the danger of flying conical heads.

The available and convenient sized power hammers are quite sufficient to produce the necessary end vibration to drill a hole satisfactorily for any size anchor shell. However, it requires considerably less power to drill the hole than to drive the anchor shells home over the plug and cause the outer form of the shell to dig into the concrete with sufficient force to properly anchor the device. This invention, as part of the integrated system, provides for a convenient supplement to the available power equipment to complete the setting of the heavier size shell anchors with complete safety and reliability.

Hence, it is another object of this invention to provide a supplemental setting device for such shell anchors and to provide a means to cause the chucking end of the fasteners to break off smoothly and uniformly.

This former object has reference to the fact that the use of a hammer to break off the chucking end of the larger fasteners quite often results in a ragged break which develops considerable problems when a flush member is later installed over the anchor. It is often necessary to exert considerable time to rectifying the uneven break. By the use of the integrated system set forth in this specification, the uniform severance of the necked area between the shell and the chucking end is greatly facilitated.

Other objects and a fuller understanding of the invention may be had by referring to the following description and claim taken in conjunction with the accompanying drawings, in which:

FIGURE 1 is a side elevational view of a power hammer with the chuck and adapter system of this invention, and a conventional fastener set forth in exploded relationship;

FIGURE 2 illustrates two different size fastener devices, with corresponding adapters;

FIGURE 3 illustrates the position of a fastener device used as a drill, at the end of the hole drilling step;

FIGURE 4 illustrates the condition of a partially completed setting step, wherein the fastener is driven into the drilled hole over a tapered expansion plug;

FIGURE 5 illustrates the use of a manual tool to carry the setting operation to completion, in some instances, from the FIGURE 4 condition;

FIGURE 6 illustrates the method of causing the taper head portion to sever from the anchored fastener; and FIGURE 7 is a section illustrating the set anchor shell with a bolt secured therein, symbolic of the practical employment of the fastener.

The drawings set forth the preferred embodiment of the invention and the manner in which it is used to provide new and improved results. FIGURE 1 sets forth the complete assembly for one size fastening device in an exploded relationship in order to better set forth the parts and the relative positions with respect to one another in actual use. A hammer 10, which is a readily available form of commercial impact hammer is representative of various types of impact hammers which may be employed for this purpose.

A chuck member 11 is provided with a shank 12 which is of a size and form to be received in the appropriate socket end of the hammer 10. The chuck 11 has a socket 13 on the opposite end from the shank 12, and a handle 15 for holding and turning the chuck.

According to this invention, an adapter 20 is provided to be positioned in the chuck 11. This adapter 20 is interchangeable to suit a particular size of fastening device to be installed. In the FIGURE 1, the fastening device which is usually referred to as a shell, is indicated by the reference character 25. The shell 25 is of conventional form being offered on the market by two or more general suppliers. It is comprised generally of a conical head 26 which is connected to the main body of the fastener by a frangible neck 27. The shell is slotted longitudinally by kerf cuts as indicated by the reference character 28. These kerf cuts 28 do not penetrate completely through the shell, ordinarily, but are frangible and will break when an expansion tensile force is applied. To apply such tensile force a taper plug 30 is caused to be driven into the end of the shell causing the kerf cuts 28 to split and the shell end to expand.

These fastener shells 25 are provided in a variety of sizes to suit particular fastening needs. The conical head 26 is correspondingly altered in size according to the size of the shell. In previous practice, it has been necessary to provide a chuck 11 having a socket 13 to suit each particular size of shell 25. Hence, it has been necessary, prior to this invention, to provide a heavy kit embodying a plurality of chucks 11. However, the adapter 20 makes possible the use of a plurality of such adapters all usable in a chuck 11. Hence, a single chuck 11 with a given size socket 13 and a plurality of adapters 20 all with the same size taper 21, but with varying sized tapering sockets 22 will greatly reduce the bulk of hardware required for installing a variety of different size shell fasteners 25. Reduction of hardware is good and desirable, but these adapters have a far greater advantage in producing a certainty of setting and providing a safety factor for persons in the vicinity to prevent injury from flying heads being removed. These features will be more fully explained at a more appropriate portion hereinafter.

A lateral opening 14, termed a keyhole, is provided through the chuck socket 13 in order to permit a romoval key to be inserted into the hole and break the wedge fit of the taper 21 in the socket 13. Likewise, a keyhole 23 in the adapter 20 will permit the forceful removal of the conical head 26 from the socket 22.

As thus far described, the adapter 20 serves a very useful purpose in reducing the amount of hardware needed by an operator to achieve the setting of a variety of shells, but it has been discovered that the adapters, when properly used, and sometimes when associated with other suitable tools, produce a system of useful novely not originally anticipated but of exceeding value.

Note that the FIGURE 2 shows two other size fastening shells with their respectove adapters 20A and 20B. Currently, these shells are made from one-quarter inch to five-eighths inch size, as the general useful range, and larger sizes are provided for specific purposes. The type of fastener shell 25 here illustrated is widely accepted because the shell itself is used as its own drill to first drill a hole into concrete and hence there is an absolute assurance of a perfect fit of the hole which is drilled for the fastener which is to be used in that hole. The fastener shell 25 is driven into the concrete while it is rotated around its axis in order to cause the drilling action. In the apparatus of this invention, the handle 15 of the chuck 11 is employed to cause the axial rotation of the adapter 20 and the shell 25 as the hammer 10 produces end vibration. The same kind of end vibration and rotation was provided by prior devices wherein there was no adapter 20.

Therefore, it will be apparent that the ability to drill a hole into concrete does not require an exceedingly large end vibration. A mason can tap a star drill with a light hammer and drill quite rapidly. A power hammer can operate even more efficiently in even very light sizes. Therefore, it is exceptionally desirable to have as light a hammer 10 as possible in order to avoid additional cost, but principally to avoid operator fatigue.

The FIGURE 3 shows the condition achieved by rotating the shell and vibrating it until it drills itself into a concrete mass. After the steps shown in FIGURE 3, the shell is removed from the hole and the hole is cleaned of the loose chips and debris. Thereafter, the plug 30 is inserted into the end of the shell and the shell and plug are placed back into the drill hole. Thereafter, the hammer 10 is employed to drive the shell down upon the plug to cause the kerf cuts 28 to fracture and the resultant tooth fingers to spread outwardly and imbed into the walls of the hole which has been drilled. This is what produces the reliable anchoring of this type of fastener which has made it so popular.

However, the amount of end force needed to drive the shell 25 over the plug 30 is far greater than the amount of force needed to simply drill a hole in normal concrete. This is where the present invention provides one unique step over prior art in addition to the reduction in the amount of hardware needed.

Refer to FIGURE 5. Here it will be seen that a manual chuck 35 is provided with a larger end stud shank 36 of special design to permit lateral impact blows without fracture. This chuck 35 is also equipped with a socket 37 formed to fit the taper 21 of the various adapters. A keyhole 38 is likewise provided to force removal of the taper.

An operator employing the present invention may therefore select a hammer heavy enough merely to cause the drilling action required and then use that hammer in the steps shown in FIGURE 4 until the capacity of the hammer is reached and final setting of the shell over the plug can no longer be accomplished with this weight hammer. At this point, a removal tool is inserted through the keyhole 14 of the chuck and the chuck is caused to separate from the adapter 20. Thereafter, the manual chuck 35 is placed upon the taper 21 and a hand hammer 40 is employed to drive the shell 25 further over the plug 30 to complete the setting action. Those acquainted with hammers of the type illustrated in the FIGURE 1 are aware that a normal small size hand hammer, such for example as a one-pound sledge, will produce a far greater impact than the power hammer of smaller sizes. Hence, although slower than a large power hammer, the hand hammer 40 can be employed after the steps shown in FIGURE 4 to produce the final setting of the shell as shown in FIGURE 5 with very little delay. The advantage of having the much lighter and less expensive power hammer far outweighs the disadvantage of having to employ the hand hammer 40 for a few strokes in the large size shell. It must be borne in mind that the smaller size power hammers will completely seat the smaller size shell. This invention enables the operator to employ the smaller size hammer to do an entire range including the bigger size shell.

A third advantage of the present invention is achieved in the safety provided against hammer damage and against flying conical heads when the heads are broken from the body of the shell. As previously indicated, the conical heads 26 are fastened to the shells 25 at a neck portion 27. The shells are case-hardened to produce an overall hard surface which enables the end teeth of the shell to cut readily into concrete. By providing the neck area 27 of a thickness about equal to the normal case-hardening penetration from both sides, the area at the neck 27 becomes quite frangible. So long as the force is placed endwise on the conical head it will not break the neck area. However, this conical head must be removed in order to employ the shell as an anchor device. The shell is internally threaded in order to receive a bolt or other fastening object. It is well known that the removal of the conical head portion 26 from the shell 25 prior to this invention has been a considerable problem. It has been taught that prior to this invention, the larger size shells conical heads must be removed by striking the conical heads a direct lateral blow in a very critical area with a hand hammer. Oftentimes, these heads will fly great distances to the damage of nearby equipment and injury of bystanders.

According to this invention, the manual chuck 35 is allowed to remain engaged upon the conical head 26 and a side blow is struck to the shank 36 as illustrated in the FIGURE 6. The mass of the manual chuck 35, together with the ability to hold onto the manual chuck by means of a handle 39, absolutely prevents damage and injury by reason of flying heads.

Finally, however, it has been discovered that the use of the manual chuck 35 produces a very desirable commercial benefit. Heretofore, when the conical head portion 26 has been broken by a direct blow of the hammer the neck area 27 has quite often broken with a ragged edge which necessitates further chipping of the edge in order to have all of the broken area down below the surface of the concrete and thus enable a device to sit evenly upon the concrete when it is fastened by the shell. It has been found that the use of the manual chuck 35 to break the conical heads 26 invariably produces a much more even break. Although it is not understood exactly why such striking of the manual chuck produces a better and cleaner break, it is theorized that the greater distance from the neck produces a quicker and more violent force through a lever arm and hence produces a more violent separation of uniform nature.

The FIGURE 7 is provided to show the completely installed shell device in concrete with a threaded fastening bolt installed to hold an object against the surface of the concrete.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In combination, a chuck and adapter construction adapted for use in providing sets of tool holders for supporting and driving hollow self-drilling expansion shells of substantially similar construction and having different size grasping heads through the use of one size percussive hammer which comprises: a series of shell holders one for each size shell except one, said shell holders each having a first tapered socket at one end thereof adapted telescopically to receive therein one end of one of said shells of a particular and conforming size excepting said one shell, a chuck member, one end of the chuck member having a tapered socket at one end thereof of a size adapted to telescopically receive therein said one size shell for which there is provided no shell holder, said second end of each said shell holders having a tapered stud coupling means for holding same operatively connected in the tapered socket of said chuck but readily separable therefrom, said chuck having a configuration at the second end thereof adapted complementarily to engage with the tool-holding configuration of a percussive hammer, whereby to enable said particular one hammer and chuck alone to be used to drive said one shell, but the said one end of said chuck being suitable for identical said operative connection with any selected one of said shell holders for driving other sizes of shells with the same chuck and hammer, thereby providing an adapter system having one less shell holder than the series of shells to be serviced.

References Cited in the file of this patent

UNITED STATES PATENTS

| | | |
|---|---|---|
| 768,186 | Lachmann | Aug. 23, 1904 |
| 1,996,121 | Phillips | Apr. 2, 1935 |
| 2,918,290 | Werstein | Dec. 22, 1959 |